(12) United States Patent
Fujikawa (10) Patent No.: US 8,125,506 B2
(45) Date of Patent: Feb. 28, 2012

(54) ELECTRO-OPTICAL DEVICE AND ELECTRONIC APPARATUS

(75) Inventor: Shinsuke Fujikawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 944 days.

(21) Appl. No.: 11/753,265

(22) Filed: May 24, 2007

(65) Prior Publication Data

US 2008/0056716 A1 Mar. 6, 2008

(30) Foreign Application Priority Data

May 26, 2006 (JP) .................... 2006-146430

(51) Int. Cl.
*B41J 2/435* (2006.01)
*B41J 2/47* (2006.01)

(52) U.S. Cl. ........ 347/247; 347/236; 347/237; 347/238; 347/240; 347/246

(58) Field of Classification Search .............. 347/247, 347/236–238, 240, 246
See application file for complete search history.

(56) References Cited

U.S. PATENT DOCUMENTS

| | | | | |
|---|---|---|---|---|
| 4,506,151 A | * | 3/1985 | MacDonald et al. ... | 250/214 LS |
| 7,924,457 B2 | * | 4/2011 | Jo ................................... | 358/1.7 |
| 2001/0048322 A1 | * | 12/2001 | Koizumi ......................... | 326/81 |

FOREIGN PATENT DOCUMENTS

JP      A-08-039862      2/1996

* cited by examiner

*Primary Examiner* — Stephen Meier
*Assistant Examiner* — Sarah Al Hashimi
(74) *Attorney, Agent, or Firm* — Oliff & Berridge, PLC (57) ABSTRACT

An electro-optical device includes a potential generating circuit that generates a first power supply potential and a second power supply potential that is different from the first power supply potential; a first signal processing circuit that selectively outputs one of a first high potential and a first low potential according to a data signal at one of at least three levels; a second signal processing circuit that selectively outputs one of a second high potential that is different from the first high potential and a second low potential that is different from the first low potential according to the data signal; a first current source that generates a first current in accordance with an output of the first signal processing circuit and the first power supply potential; a second current source that generates a second current in accordance with an output of the second signal processing circuit and the second power supply potential; and an electro-optical element that provides a tone level according to the first current and the second current.

8 Claims, 7 Drawing Sheets

ELECTRO-OPTICAL DEVICE AND ELECTRONIC APPARATUS

CROSS-REFERENCE TO RELATED APPLICATION

This application claims priority from Japanese Patent Application No. 2006-146430 filed in the Japanese Patent Office on May 26, 2006, the entire disclosure of which is hereby incorporated by reference in its entirety.

BACKGROUND

1. Technical Field

Exemplary embodiments of the present invention relate to techniques for controlling electro-optical elements, such as organic light-emitting diodes.

2. Related Art

Figure 14:
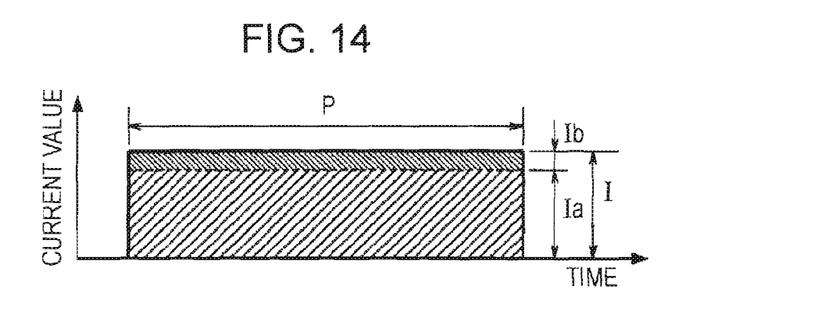
FIG. 14 is a conceptual diagram showing the relationship between a drive current and a correction current according to a known technique.

Electro-optical devices including an arrangement of a plurality of electro-optical elements are used for various applications, such as exposure devices of electrophotographic image forming apparatuses or display devices of various electronic apparatuses. For this type of electro-optical device, techniques for correcting characteristic errors (differences from design values or variations among the elements) of the electro-optical elements or active elements for driving the electro-optical elements have been proposed. For example, JP-A-8-39862 (FIG. 6) discloses, as shown in FIG. 14, a technique for supplying a drive current I, which is the sum of a predetermined drive current Ia and a correction current Ib according to a correction value of each light-emitting element, to the light-emitting element over a time length T according to a tone level specified to the light-emitting element.

Since the correction current Ib in the above structure is a current for correcting a small characteristic error of each light-emitting element or active element, the current value of the correction current Ib is significantly smaller than that of the drive current Ia. In general, a circuit that can generate such a small current with high precision and implement correction over a wide range is difficult to realize. If such a circuit is realized, the size of the circuit becomes large.

SUMMARY

Exemplary embodiments of the invention correct the tone level of each light-emitting element with a simple structure.

According to an exemplary embodiment, there is provided an electro-optical device including the following elements: a potential generating circuit that generates a first power supply potential (e.g., a potential VAN1 shown in FIG. 4) and a second power supply potential (e.g., a potential VAN2 shown in FIG. 4) that is different from the first power supply potential; a first signal processing circuit that selectively outputs one of a first high potential (e.g., a potential VDD1 shown in FIG. 4) and a first low potential (e.g., a potential VSS1 shown in FIG. 4) according to a data signal at one of at least three levels; a second signal processing circuit that selectively outputs one of a second high potential (e.g., a potential VDD2 shown in FIG. 4) that is different from the first high potential and a second low potential (e.g., a potential VSS2 shown in FIG. 4) that is different from the first low potential according to the data signal; a first current source that generates a first current in accordance with an output of the first signal processing circuit and the first power supply potential; a second current source that generates a second current in accordance with an output of the second signal processing circuit and the second power supply potential; and an electro-optical element that provides a tone level according to the first current and the second current.

With the above structure, the generation of the first current by the first current source and the generation of the second current by the second current source are individually controlled according to the multi-value data signal. Therefore, a period during which the second current is generated can be set to be shorter than a period during which the first current is generated. With this structure, the current value of the second current can be greater than that in the case where the tone level of each electro-optical element is always controlled according to the sum of the first current and the second current. Therefore, the tone level of each electro-optical element can be corrected with high precision, while the circuit size of the second current source is reduced. Compared with the case in which the first current and the second current are individually controlled using different data signals (e.g., binary signals), the rate at which the data signal is transferred or the operation speed of the first and second signal processing circuits is reduced, and the number of data signal transfer lines or the number of signal input terminals is reduced.

According to an exemplary embodiment, the first high potential differs from the second high potential, and the first low potential differs from the second high potential. Therefore, if a common power supply potential is supplied to the first current source and the second current source, the relationship between the output of the first signal processing circuit and the first current becomes different from the relationship between the output of the second signal processing circuit and the second current. According to an exemplary embodiment, since the first power supply potential supplied to the first current source and the second power supply potential supplied to the second current source are set to different values, the relative relationship between the first current and the second current can be easily understood at the time of design. For example, in the case that the first and second current sources include transistors, the first current and the second current can be easily and reliably set to an expected ratio according to the characteristics (e.g., the channel widths) of the transistors, provided that the voltage between the gate and the source of the first current source (the difference between the first high potential or the first low potential and the first power supply potential) is made substantially equal to the voltage between the gate and the source of the second current source (the difference between the second high potential or the second low potential and the second power supply potential) by appropriately selecting the first power supply potential and the second power supply potential. Even in the case that the first and second signal processing circuits include logic circuits (e.g., memories M1 and M2 shown in FIG. 5) driven by different voltages, no conversion circuit for equalizing the logic levels of the logic circuits is necessary. This advantageously reduces the circuit size of the electro-optical device.

The electro-optical element is an element that changes its optical characteristics, such as brightness or transmission factor, by applying electrical energy, such as current or voltage, to the electro-optical element. For example, some embodiments of the invention are applicable to an electro-optical device (light-emitting device) using light-emitting elements, such as organic light-emitting diodes, as electro-optical elements. Needless to say, the structure having, besides the first and second signal processing circuits and the first and second current sources, an additional signal processing circuit or an additional current source (e.g., the structure having at least three pairs of a signal processing circuit (C1 to C3) and a current source (Q1 to Q3) shown in FIG. 9) may belong to the scope of the invention.

Figure 7:
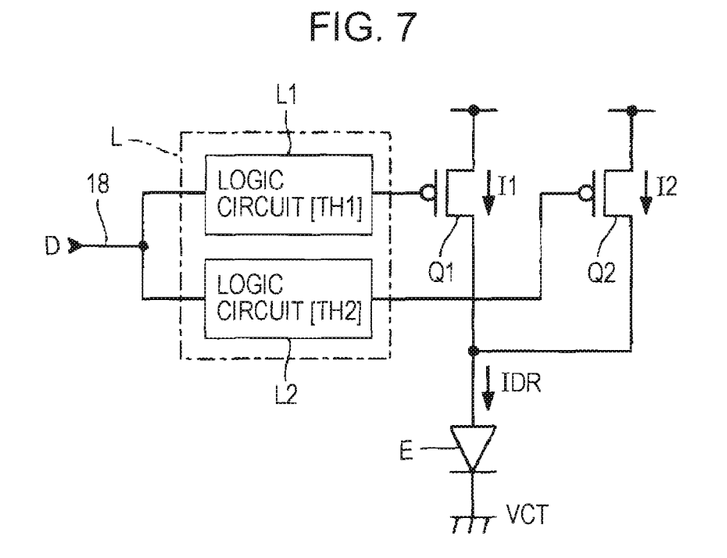
FIG. 7 is a block diagram of the structure of a unit circuit according to a comparative example.

To control each of the first and second current sources on a binary basis according to the multi-value data signal, for example, the first signal processing circuit controls the first current source on a binary basis according to a first threshold and the level of the data signal, and the second signal processing circuit controls the second current source on a binary basis according to a second threshold differing from the first threshold and the level of the data signal (e.g., the structure shown in FIG. 7). In this structure, however, it is necessary to make the characteristics (e.g., the channel widths) of active elements of the first and second signal processing circuits different in order to achieve an expected relative ratio of the first and second thresholds. This imposes a difficulty in reducing the size of the first and second signal processing circuits. Accordingly, it is preferable that the first signal processing circuit include a first logic circuit that selectively outputs one of the first high potential and the first low potential according to the data signal, the first high potential and the first low potential serving as logic levels, and that the second signal processing circuit include a second logic circuit that selectively outputs one of the second high potential and the second low potential according to the data signal, the second high potential and the second low potential serving as logic levels. Accordingly, the size of the first and second signal processing circuits can be reduced to be smaller than that in the case where the multi-value data signal is converted into binary signals according to the relative ratio of the first and second thresholds.

It is preferable that the first low potential and the second low potential be the same potential, and that the data signal be at one of the levels of the first high potential, the first low potential, and the second low potential. Accordingly, the total number of potentials supplied from the outside to the electro-optical device is reduced. This further reduces the power necessary for driving the electro-optical device.

It is also preferable that the electro-optical device further include a first selection circuit that selects a first on-potential (e.g., a potential VG1 shown in FIG. 8) or a first off-potential (e.g., the potential VDD1 shown in FIG. 8) according to an output of the first logic circuit; and a second selection circuit that selects a second on-potential (e.g., a potential VG2 shown in FIG. 8) that is different from the first on-potential or a second off-potential (e.g., the potential VDD2 shown in FIG. 8) that is different from the first off-potential according to an output of the second logic circuit. In this case, the first current source generates the first current on the basis of the potential selected by the first selection circuit and the first power supply potential, and the second current source generates the second current on the basis of the potential selected by the second selection circuit and the second power supply potential. Accordingly, the first current and the second current can be adjusted by appropriately adjusting the first on-potential, the second-on potential, the first off-potential, and the second off-potential, without needing to change the first high potential and the first low potential used in the first signal processing circuit and the second high potential and the second low potential used in the second signal processing circuit (that is, without affecting the operation of the first and second signal processing circuits). This will be described later as a second embodiment.

It is preferable that the first current source be a transistor having a source to which the first power supply potential is supplied and a gate having a potential according to the output of the first signal processing circuit, and that the second current source be a transistor having a source to which the second power supply potential is supplied and a gate having a potential according to the output of the second signal processing circuit. Accordingly, the current values of the first current and the second current can be easily set by appropriately selecting the characteristics (e.g., the channel lengths and channel widths) of the transistors used as the first and second current sources.

The electro-optical device according to an exemplary embodiment of the invention is used in various electronic apparatuses. A typical example of an electronic apparatus is an electrophotographic image forming apparatus using the electro-optical device according to an exemplary embodiment of the invention to expose an image supporting member, such as a photosensitive drum or the like. The image forming apparatus includes the image supporting member on which a latent image is formed by exposure, the electro-optical device according to an exemplary embodiment of the invention, which is used to expose the image supporting member, and a developing unit that develops an image by applying a developer such as toner to the latent image on the image supporting member. However, the use of the electro-optical device according to an exemplary embodiment of the invention is not limited to exposing the image supporting member. For example, the electro-optical device according to the aspect of the invention can be used to illuminate a document in an image scanning apparatus such as a scanner. The image scanning apparatus includes the electro-optical device according to an exemplary embodiment and a light receiving device (such as a charged coupled device (CCD)) that converts light emitted from the electro-optical device and reflected from an object to be scanned (e.g., the document) into an electrical signal. The electro-optical device having electro-optical elements arranged in a matrix may also be used as a display section of various electronic apparatuses, such as a personal computer and a cellular phone.

Some embodiments of the invention can be specified as a method of driving the electro-optical device. The drive method includes generating a first power supply potential and a second power supply potential that is different from the first power supply potential; generating a first current in accordance with one of a first high potential and a first low potential selected according to a data signal at one of at least three levels and the first power supply potential; generating a second current in accordance with one of a second high potential that is different from the first high potential and a second low potential that is different from the first low potential selected according to the data signal and the second power supply potential; and controlling an electro-optical element to provide a tone level according to the first current and the second current. With this method, advantages similar to those of the electro-optical device according to an embodiment of the invention can be achieved.

BRIEF DESCRIPTION OF THE DRAWINGS

Exemplary embodiments of the invention will be described with reference to the accompanying drawings, wherein like numbers reference like elements.

DESCRIPTION OF EXEMPLARY EMBODIMENTS

A. First Embodiment

Figure 1:
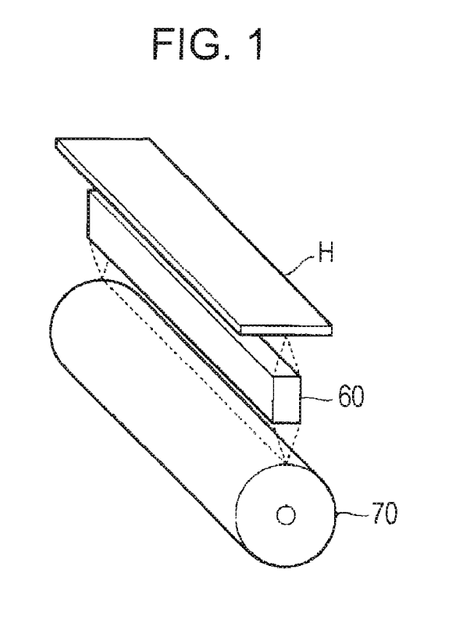
FIG. 1 is a perspective view of the structure of part of an image forming apparatus according to a first embodiment.

FIG. 1 is a perspective view of the structure of part of an electrophotographic image forming apparatus using an electro-optical device according to a first embodiment of the invention as an exposure device (line head). As shown in FIG. 1, the image forming apparatus includes an electro-optical device H, a converging lens array 60, and a photosensitive drum 70. The photosensitive drum 70 is supported by a rotating shaft extending in a main scanning direction and rotates in such a manner that the peripheral surface of the photosensitive drum 70 faces the electro-optical device H. The converging lens array 60 is a condenser having an array of many gradient index lenses and is positioned between the electro-optical device H and the photosensitive drum 70.

Figure 2:
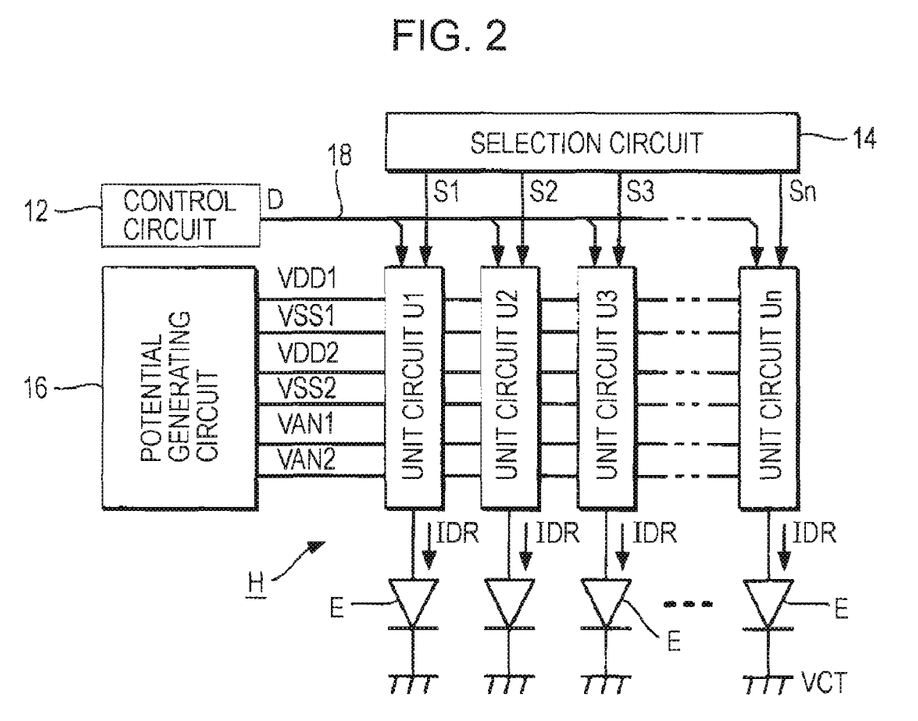
FIG. 2 is a block diagram of the structure of an electro-optical device.

FIG. 2 is a block diagram of the structure of the electro-optical device H. As shown in FIG. 2, the electro-optical device H includes an array of n electro-optical elements E arranged in the main scanning direction and n unit circuits U1 to Un corresponding to the electro-optical elements E, respectively (where n is a natural number). The electro-optical elements E and the unit circuits U1 to Un are formed on an insulating substrate. The unit circuit Ui at an i-th stage (where i is an integer satisfying $1 \leq i \leq n$) supplies a drive current IDR to the electro-optical element E at the i-th stage. The electro-optical elements E are organic light-emitting diodes (light-emitting elements) each having a light-emitting layer made of an organic electroluminescence (EL) material between an anode and a cathode facing each other. Each of the electro-optical elements E emits light with a brightness according to the current value of the drive current IDR. As shown in FIG. 1, a light beam emitted from each of the electro-optical elements E passes through the converging lens array 60 and reaches the surface of the photosensitive drum 70. With this exposure, a latent image in accordance with a desired image is formed on the surface of the photosensitive drum 70.

Figure 3:
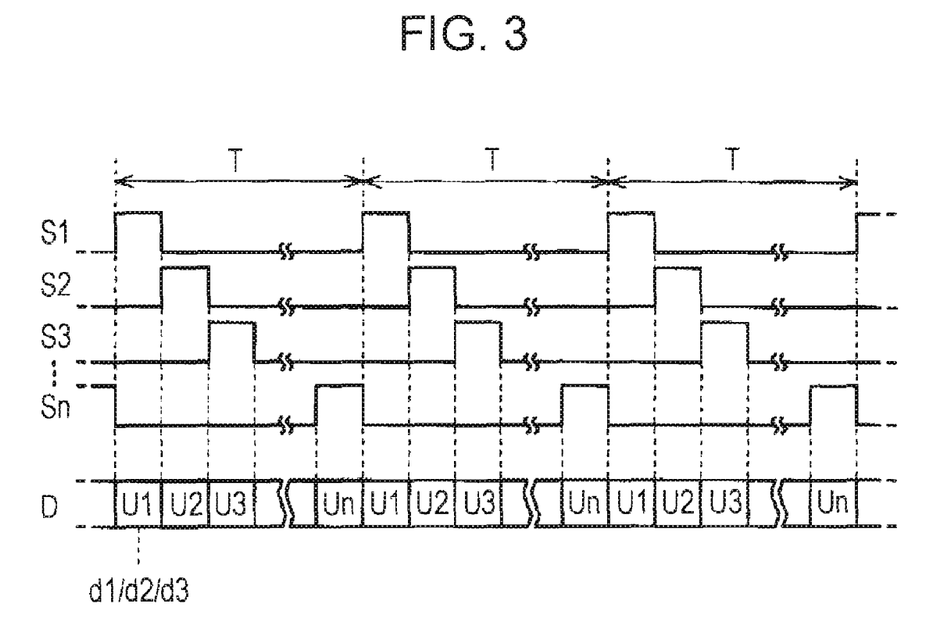
FIG. 3 is a timing chart showing the relationship between selection signals and a data signal.

As shown in FIG. 2, the electro-optical device H includes a control circuit 12, a selection circuit 14, and a potential generating circuit 16. The control circuit 12 controls each element by supplying a control signal (e.g., a clock signal) and outputs a data signal D to a signal line 18. The data signal D is a voltage signal for specifying a tone level to each electro-optical element E. The selection circuit 14 is a section that generates and outputs selection signals S1 to Sn for sequentially selecting the n unit circuits U1 to Un (e.g., an n-bit shift register). As shown in FIG. 3, the selection signals S1 to Sn sequentially reach an active level (high level) every predetermined period (hereinafter referred to as a "unit period") T.

Figure 4:
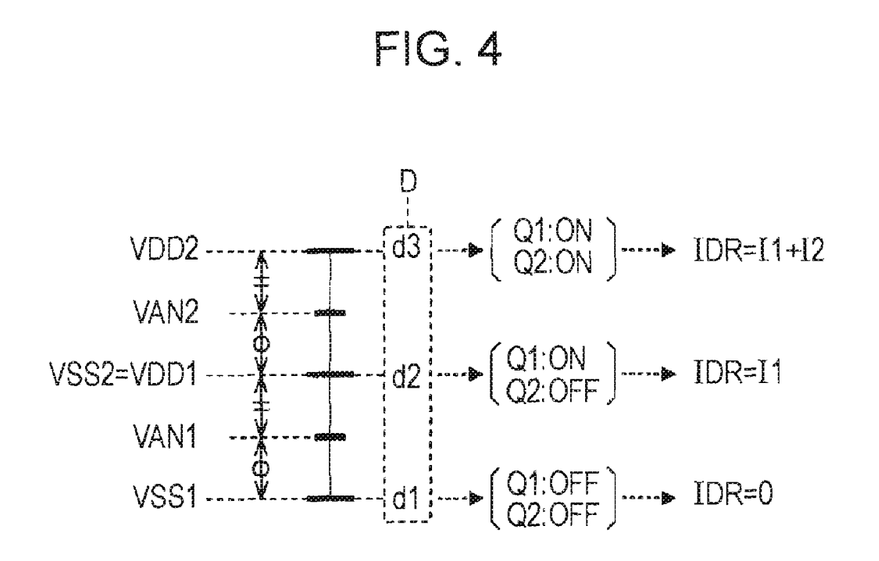
FIG. 4 is a conceptual diagram of the level of each potential generated by a potential generating circuit.

The potential generating circuit 16 shown in FIG. 2 generates a plurality of potentials (VDD1, VSS1, VDD2, VSS2, VAN1, VAN2, and VCT) used in the electro-optical device H. FIG. 4 schematically shows the level of each potential generated by the potential generating circuit 16. As shown in FIG. 4, the potential VDD1 and the potential VSS2 are the same potential. In the following description, however, the potential VDD1 and the potential VSS2 are distinguished from each other for convenience using different reference numerals. The potential VSS1 is lower than the potential VDD1, and the potential VDD2 is higher than the potential VSS2. The potential VAN1 is a potential between the potential VSS1 and the potential VDD1, and the potential VAN2 is a potential between the potential VSS2 and the potential VDD2. The potential VCT is, as shown in FIG. 2, commonly supplied to the cathode of each electro-optical element E and serves as a reference potential (e.g., a ground potential) for the voltage of each element. The potential VCT is lower than the potential VAN1 or the potential VAN2.

Figure 5:
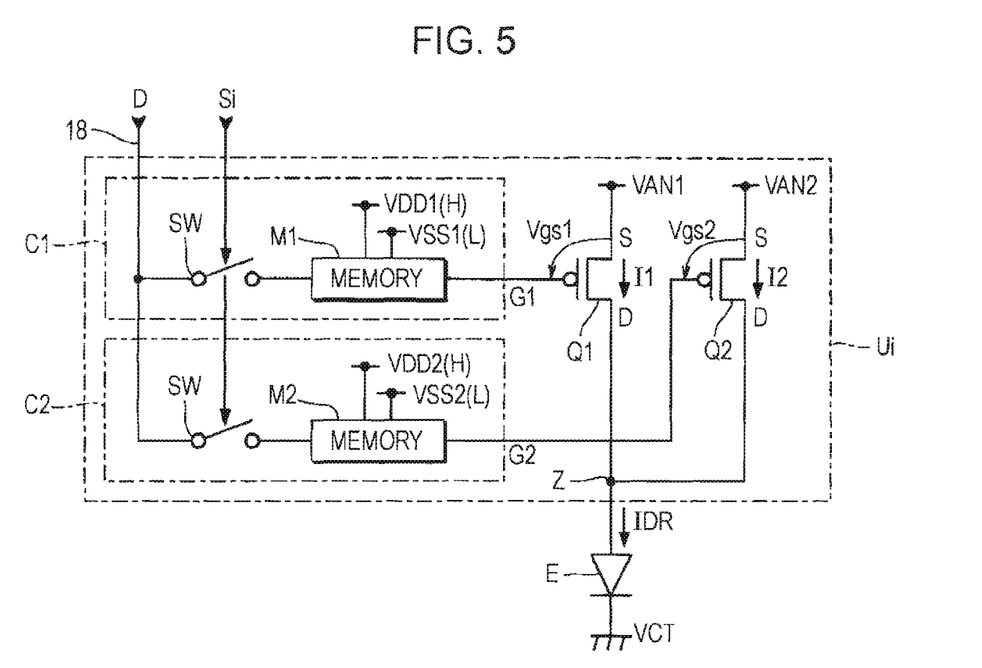
FIG. 5 is a block diagram of the structure of a unit circuit.

Referring now to FIG. 5, the structure of each of the unit circuits U1 to Un will be described. Although only one unit circuit U1 at the i-th stage is shown in FIG. 5, the unit circuits U1 to Un have the same structure. As shown in FIG. 5, the unit circuit Ui includes two signal processing circuits C (C1 and C2) and two current sources Q (Q1 and Q2).

Figure 6:
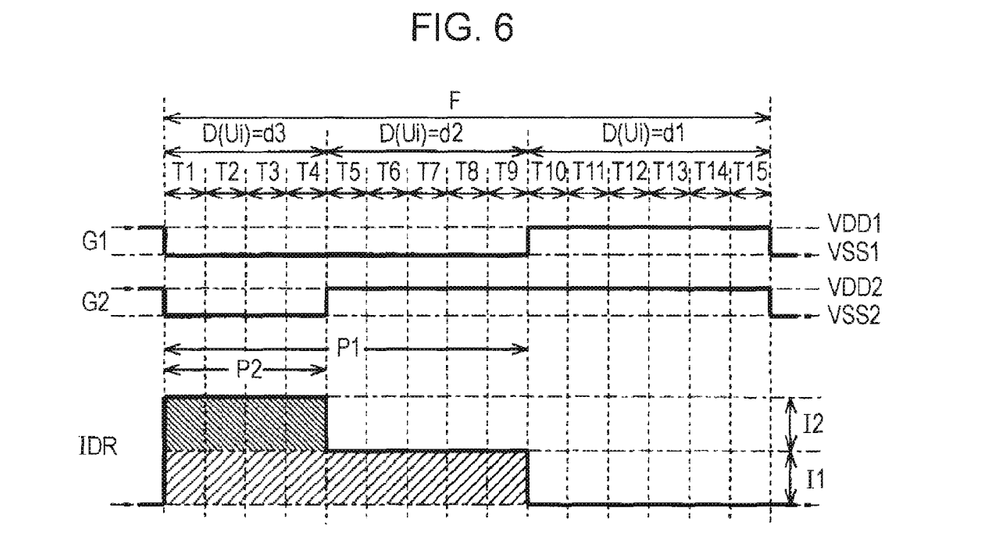
FIG. 6 is a timing chart for describing the waveform of a drive current.

The current source Q1 is a section that generates a drive current I1. The current source Q2 is a section that generates a correction current I2. According to the first embodiment, p-channel thin-film transistors are shown as examples of the current sources Q1 and Q2. The gate of the current source Q1 is connected to an output end of the signal processing circuit C1, and the gate of the current source Q2 is connected to an output end of the signal processing circuit C2. The potential VAN1 generated by the potential generating circuit 16 is supplied to the source of the current source Q1, and the potential VAN2 is supplied to the source of the current source Q2. The drains of the current sources Q1 and Q2 are connected to a node Z. The node Z is connected to the anode of the electro-optical element E. As shown in FIG. 6, the sum of the drive current I1 and the correction current I2, that is, the drive current IDR, is supplied to the electro-optical element E. The electro-optical element E is controlled to emit light whose amount is controlled according to a time integral of the drive current IDR, which will be described later.

A period during which the drive current I1 is generated (hereinafter referred to as a "drive period") P1, and a period during which the correction current I2 is generated (hereinafter referred to as a "correction period") P2 are individually controlled according to the data signal D. The drive period P1 is set to a time length according to a tone level specified to the electro-optical element E. That is, as shown in FIG. 6, the drive current I1 is supplied to the node Z for the drive period P1 consisting of unit periods T (T1 to T9), the number of which corresponds to the tone level specified to the electro-optical element E, of a period F corresponding to 15 unit periods T (T1 to T15). For the remaining period (T10 to T15) of the period F, the supply of the drive current I1 is stopped.

The time length of the correction period P2 is determined in accordance with the results of preliminary observations and measurements of the characteristics of the unit circuits U1 to Un (particularly the current sources Q1 and Q2) and the electro-optical elements E such that the actual tone levels of the electro-optical elements E to which the same tone level is specified are equalized. That is, as shown in FIG. 6, the correction current I2 is supplied to the node Z for the correction period P2 consisting of the unit periods T (T1 to T4), the number of which corresponds to the characteristics of the unit circuit U and the electro-optical element E, of the period F. For the remaining period (T5 to T15) of the period F, the supply of the correction current I2 is stopped. As shown in FIG. 6, the drive period P1 and the correction period P2 are periods starting from the beginning of the period F. The correction period P2 is set to be shorter than the drive period P1. Therefore, the current value of the drive current IDR is controlled to be one of the following: (1) the sum of the drive current I1 and the correction current I2 (T1 to T4 of FIG. 6); (2) the current value of the drive current I1 (T5 to T9); and (3) zero (T10 to T15).

Assume that the time integral of the drive current IDR of the first embodiment is the same as the time integral of the drive current I shown in FIG. 14 (that is, when the electro-optical elements E are controlled to provide the same tone level). According to the first embodiment, the correction period P2 during which the correction current I2 is supplied is set to be shorter than a period P of FIG. 14. Therefore, if the drive current I1 of FIG. 6 and the current Ia of FIG. 14 have the same current value and the same pulse width, the correction current I2 of FIG. 6 is set to be larger than the current Ib of FIG. 14. That is, according to the first embodiment, it is no longer necessary to set the correction current I2 to a very small current value (the current Ib of FIG. 14). Therefore, a large circuit that can generate a small current becomes no longer necessary, and the current value of the correction current I2 can be controlled with high precision. As shown in FIG. 5, when the current sources Q1 and Q2 are provided for each electro-optical element E, the number of current sources Q1 and Q2 increases as the electro-optical elements E provide higher resolution. In that case, it becomes difficult to provide sufficient space for the current sources Q1 and Q2. According to the first embodiment, the space needed for the current source Q2 is reduced. Accordingly, the resolution of the electro-optical elements E can be easily improved.

Figure 12:
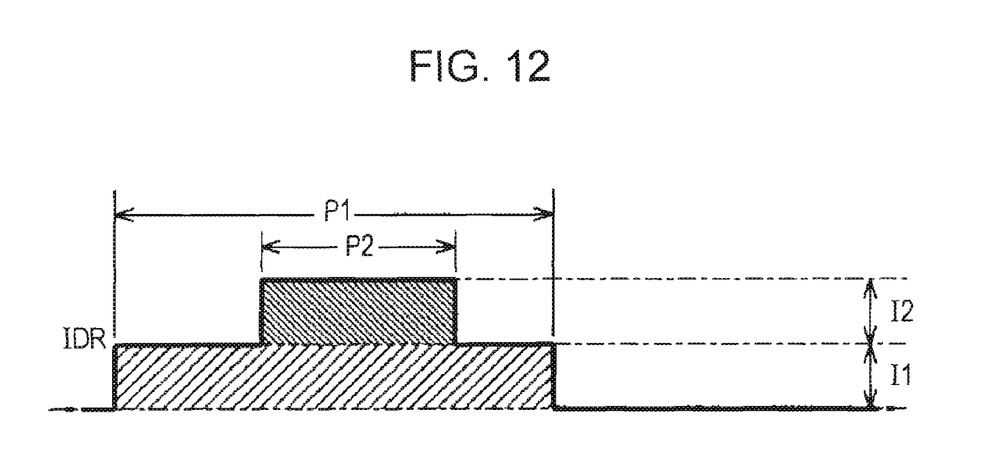
FIG. 12 is a timing chart showing the waveform of the drive current according to a modification.

The control circuit 12 shown in FIG. 12 generates the data signal D such that the drive current IDR satisfying the following conditions is generated. The data signal D according to the first embodiment is a multi-value voltage signal specifying the generation and stopping of the drive current I1 and the correction current I2 for each unit time T. As shown in FIG. 3, the data signal D has one of three potentials d1 to d3 according to the tone level specified to the unit circuit Ui in a period during which a selection signal Si reaches an active level. The potential d1 specifies the stopping of both the drive current I1 and the correction current I2. The potential d2 specifies the generation of the drive current I1 and the stopping of the correction current I2. The potential d3 specifies the generation of both the drive current I1 and the correction current I2. As shown in FIG. 4, the potential VSS1 generated by the potential generating circuit 16 is used as the potential d1. Similarly, the potential VSS2 (=VDD1) is also used as the potential d2 of the data signal D, and the potential VDD2 is also used as the potential d3.

As has been described above, the multi-value data signal D is used in the first embodiment. In comparison with the structure in which, for example, the generation and stopping of the drive current I1 and the generation and stopping of the correction current I2 are specified using different binary signals, the rate at which the data signal D is transferred or the operation speed of the signal processing circuits C1 and C2 is reduced, and the number of signal transfer lines or the number of signal input terminals is reduced.

As shown in FIG. 5, the data signal D output from the control circuit 12 is commonly supplied to the signal processing circuits C1 and C2 of each of the unit circuits U1 to Un via the signal line 18. The signal processing circuits C1 and C2 are sections that obtain and maintain the data signal D supplied from the control circuit 12 (latch circuits). The signal processing circuit C1 includes a memory M1 having an output end connected to the gate of the current source Q1, and a switch SW provided between the signal line 18 and the memory M1 for controlling an electrical connection established between the signal line 18 and the memory M1. Similarly, the signal processing circuit C2 includes a memory M2 having an output end connected to the gate of the current source Q2, and a switch SW for controlling an electrical connection established between the signal line 18 and the memory M2. Each of the switches SW of the unit circuit Ui is selectively turned on during the period in which the selection signal Si is at the active level (high level). The memories M1 and M2 each obtain the data signal D from the signal line 18 during the period in which the corresponding switch SW is turned on and maintain an output according to the potential of the data signal D until the next time the selection signal Si reaches the active level.

The memory M1 is a logic circuit activated by the potential VDD1 and the potential VSS1 serving as power supply potentials. The memory M1 outputs a control signal G1 generated by inverting the logic level of the data signal D to the gate of the current source Q1. That is, as shown in FIG. 6, the memory M1 outputs the control signal G1 at the potential VDD1 (high level) in the case that the data signal D obtained from the signal line 18 has the potential d1 (low level), and the memory M1 outputs the control signal G1 at the potential VSS1 (low level) in the case that the data signal D has the potential d2 or d3 (high level).

The memory M2 is a logic circuit activated by the potential VDD2 and the potential VSS2 serving as power supply potentials. As in the memory M1, the memory M2 outputs a control signal G2 generated by inverting the logic level of the data signal D to the gate of the current source Q2. That is, as shown in FIG. 6, the memory M2 outputs the control signal G2 at the potential VDD2 (high level) in the case that the data signal D obtained from the signal line 18 has the potential d1 or d2 (low level), and the memory M2 outputs the control signal G2 at the potential VSS2 (low level) in the case that the data signal D has the potential d3 (high level). As has been described, since the memories M1 and M2 have different potentials corresponding to the logic levels, the control signals G1 and G2 in the case that the data signal D has the potential d2 have different logic levels. The higher potential VDD1 of the control signal G1 is different from the higher potential VDD2 of the control signal G2, and the lower potential VSS1 of the control signal G2 is different from the lower potential VSS2 of the control signal G2.

The current sources Q1 and Q2 shown in FIG. 5 operate in a saturation region. Therefore, the drive current I1 has a current value according to a voltage Vgs1 between the gate and the source of the current source Q1 (current value independent of the voltage between the source and the drain). That is, the current source Q1 generates the drive current I1 in the case that the control signal G1 has the potential VSS1 and stops generating the drive current I1 in the case that the control signal G1 has the potential VDD1. Similarly, the correction current I2 has a current value according to a voltage Vgs2 between the gate and the source of the current source Q2. That is, the current source Q2 generates the correction current I2 in the case that the control signal G2 has the potential VSS2 and stops generating the correction current I2 in the case that the control signal G2 has the potential VDD2. Therefore, as shown in FIG. 6, in the case that the data signal D obtained in the unit circuit Ui has the potential d1, the current value of the drive current IDR output to the electro-optical element E is zero. In the case that the data signal D has the potential d2, the drive current I1 is output as the drive current IDR. In the case that the data signal D has the potential d3, the sum of the drive current I1 and the correction current I2 is output as the drive current IDR.

The potential VAN1 at the source of the current source Q1 and the potential VAN2 at the source of the current source Q2 are set to individual potentials such that the voltage Vgs1 of the current source Q1 and the voltage Vgs2 of the current source Q2 are substantially equal. Specifically, assume a case that the control signals G1 and G2 are at a low level (potentials VSS1 and VSS2) (that is, the drive current I1 and the correction current I2 are generated). The voltage Vgs1, which is the difference between the potential VSS1 at the gate of the current source Q1 and the potential VAN1 at the source of the current source Q1 (Vgs1=VSS1−VAN1) is equal to the voltage Vgs2, which is the difference between the potential VSS2 at the gate of the current source Q2 and the potential VAN2 at the source of the current source Q2 (Vgs2=VSS2−VAN2). Therefore, the potential VAN1 and the potential VAN2 satisfy the following equation:

$$VAN2-VAN1=VSS2-VSS1 \quad (1)$$

As has been described above, as the structure in which the current sources Q1 and Q2 are binary-controlled on the basis of the multi-value data signal D, for example, as shown in FIG. 7, the structure in which a multi-value-to-binary conversion circuit L is provided between the signal line 18 and the current sources Q1 and Q2, as disclosed in JP-A-61-43827, may also be available. In the structure shown in FIG. 7, a logic circuit L1 including a transistor having a threshold voltage TH1 is positioned between the signal line 18 and the current source Q1, and a logic circuit L2 including a transistor with a threshold voltage TH2 that is different from the threshold voltage TH1 is positioned between the signal line 18 and the current source Q2. With the structure shown in FIG. 7, however, it is necessary to make characteristics (e.g., the channel widths) of the transistors of the logic circuits L1 and L2 different so that the threshold voltages TH1 and TH2 are set to an expected relative ratio. It is thus difficult to reduce the size of the logic circuits L1 and L2. In contrast, according to the first embodiment, the current sources Q1 and Q2 are controlled on a binary basis in accordance with the multi-value data signal D using the structure in which the signal processing circuits C1 and C2 have different power supply potentials. It thus becomes unnecessary to have such large circuits, such as the logic circuits L1 and L2 shown in FIG. 7. However, it is not intended that the structure shown in FIG. 7 be excluded from the scope of the invention.

As has been described above, according to the first embodiment, the potential VSS1 for activating the current source Q1 is different from the potential VSS2 for activating the current source Q2. Therefore, if the source of the current source Q1 and the source of the current source Q2 are at the same potential, it is necessary to select outputs of the memories M1 and M2 such that the expected drive current I1 and correction current I2 are generated, individually taking into consideration the relationship between the gate potential of the current source Q1 and the drive current I1 and the relationship between the gate potential of the current source Q2 and the correction current I2. In contrast, according to the first embodiment, the source potentials (VAN1 and VAN2) of the current sources Q1 and Q2 are set to different potentials such that the voltage Vgs1 of the current source Q1 and the voltage Vgs2 of the current source Q2 become the same voltage. That is, the relationship between the gate potential of the current source Q1 and the drive current I1 is common to the relationship between the gate potential of the current source Q2 and the correction current I2. Therefore, the drive current I1 and the correction current I2 can be easily and reliably set to the expected relative ratio according to the characteristics (e.g., the channel widths) of the current sources Q1 and Q2, regardless of the difference in the potentials of the control signals G1 and G2. This facilitates the design.

Even in the structure in which the sources of the current sources Q1 and Q2 are set to the same potential, the voltage between the gate and the source of the current source Q1 can be made equal to that of the current source Q2 by positioning a level shifter that changes each signal such that the potential of the control signal G1 matches the potential of the control signal G2 between each of the memories M1 and M2 and each of the current sources Q1 and Q2. However, the size of the unit circuits U1 to Un increases because of the arrangement of the level shifters. Since one level shifter is provided for each electro-optical element E, the size increase in the unit circuits U1 to Un is especially a serious problem in the case that the resolution of the electro-optical elements E is increased. According to the first embodiment in which the potentials VAN1 and VAN2 are different, no level shifter is necessary. This suppresses the size increase in the unit circuits U1 to Un.

B. Second Embodiment

Next, a second embodiment of the invention will be described. The elements of the second embodiment with operations and functions common to those of the first embodiment are denoted with the same reference numerals, and detailed descriptions thereof are omitted where appropriate.

Figure 8:
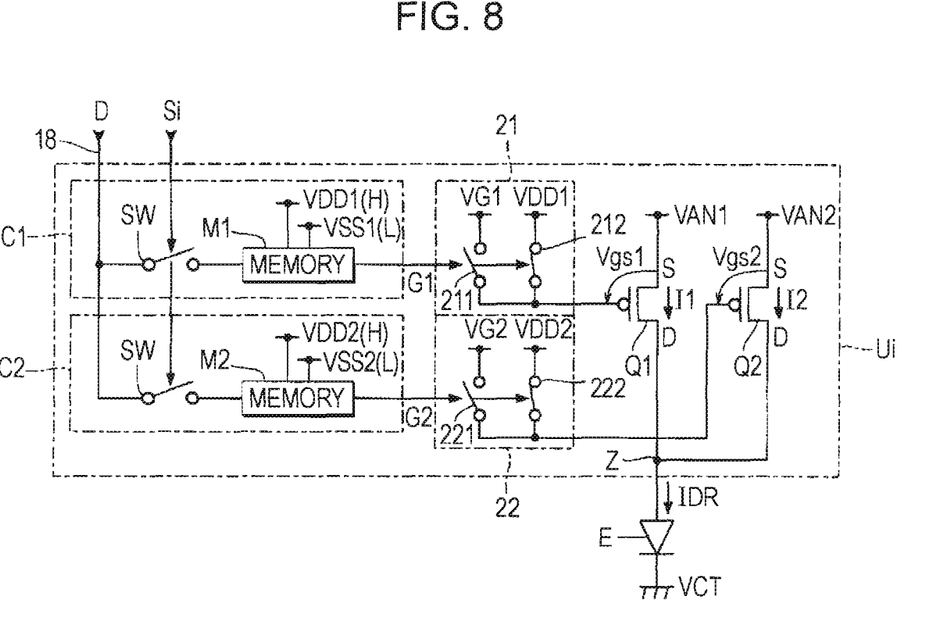
FIG. 8 is a block diagram of the structure of a unit circuit according to a second embodiment.

FIG. 8 is a block diagram of the structure of the unit circuit Ui. As shown in FIG. 8, the unit circuit Ui according to the second embodiment additionally includes, besides the elements of the unit circuit Ui according to the first embodiment (FIG. 5), a selection circuit 21 positioned between an output end of the memory M1 and the gate of the current source Q1, and a selection circuit 22 positioned between an output end of the memory M2 and the gate of the current source Q2. The potential generating circuit 16 additionally generates, besides the potentials shown in FIG. 4, potentials VG1 and VG2. The potential VG1 is a potential greater than or equal to the potential VSS1 and less than or equal to the potential VDD1 (VSS1≦VG1≦VDD1), and the potential VG2 is a potential greater than or equal to the potential VSS2 and less than or equal to the potential VDD2 (VSS2≦VG2≦VDD2).

The selection circuit 21 shown in FIG. 8 is a section that selectively outputs one of the potential VG1 and the potential VDD1 according to the control signal G1 output from the memory M1. The selection circuit 21 includes a switch 211 positioned between a line to which the potential VG1 is supplied and the current source Q1, and a switch 212 positioned between a line to which the potential VDD1 is supplied and the current source Q1. The switches 211 and 212 operate in an exclusive manner. That is, in the case that the control signal G1 is at a high level (potential VDD1), the switch 212 is turned on. In the case that the control signal G1 is at a low level (potential VSS1), the switch 211 is turned on. Therefore, in the case that the control signal G1 is at a low level, the potential VG1 is supplied to the gate of the current source Q1, thereby generating the drive current I1. In the case that the control signal G1 is at a high level, the potential VDD1 is supplied to the gate of the current source Q1, thereby stopping the generation of the drive current I1.

The selection circuit 22 shown in FIG. 8 is a section that selectively outputs one of the potential VG2 and the potential VDD2 according to the control signal G2 output from the memory M2. As in the selection circuit 21, the selection circuit 22 includes a switch 221 that is selectively turned on in the case that the control signal G2 is at a low level (potential VSS2) to supply the potential VG2 to the current source Q2, and a switch 222 that is selectively turned on in the case that the control signal G2 is at a high level (potential VDD2) to supply the potential VDD2 to the current source Q2. Therefore, as in the first embodiment, the correction current I2 is generated in the case that the control signal G2 is at a low level, and the generation of the correction current I2 is stopped in the case that the control signal G2 is at a high level. According to the second embodiment, advantages similar to those of the first embodiment can be achieved.

With the structure as in the first embodiment in which the power supply potentials VDD1 and VSS1 of the memory M1 are directly supplied to the gate of the current source Q1, the power supply potentials VDD1 and VSS1 of the memory M1 need to be changed to adjust the current value of the drive current I1. Similarly, the adjustment of the correction current I2 requires the adjustment of the power supply potentials VDD2 and VSS2 of the memory M2. However, when the power supply potentials of the memories M1 and M2 are changed, a characteristic value that determines the time constant of each circuit, such as an on-resistor of the transistor of each of the memories M1 and M2, is also changed. This may affect the operation speed or margin of the memories M1 and M2. Accordingly, the range in which the drive current I1 and the correction current I2 can be adjusted is limited. In contrast, according to the second embodiment, the drive current I1 is adjusted according to the potential VG1, and the correction current I2 is adjusted according to the potential VG2. That is, the power supply potentials of the memories M1 and M2 need not be changed. Therefore, the drive current I1 and the correction current I2 can be adjusted within a wide range without affecting the operation of the memories M1 and M2.

C. Third Embodiment

Figure 9:
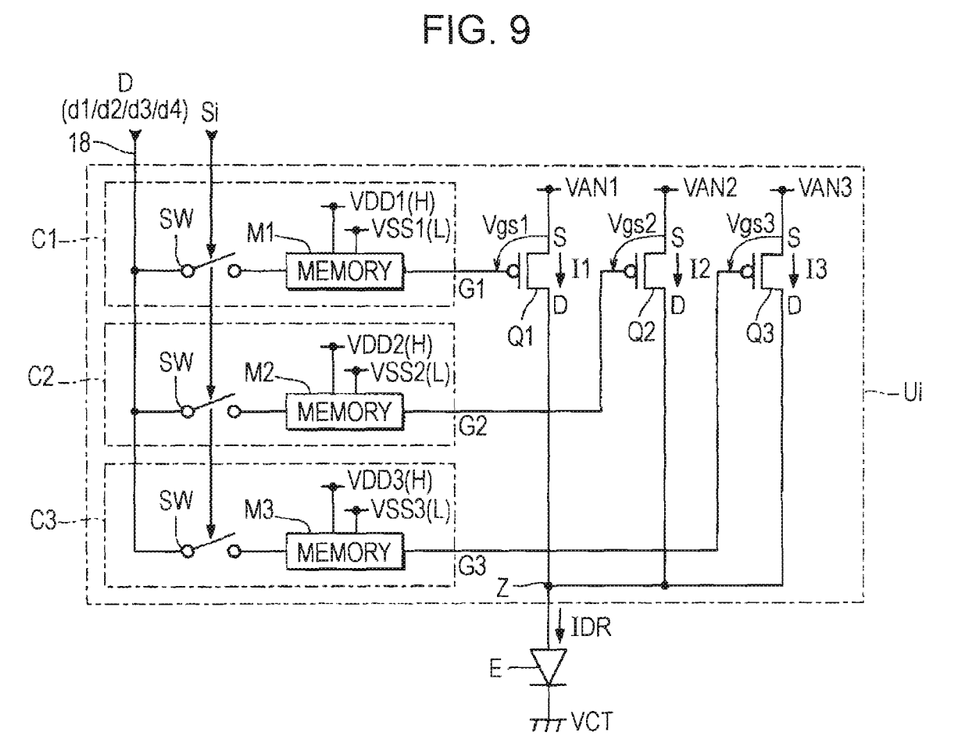
FIG. 9 is a block diagram of the structure of a unit circuit according to a third embodiment.

The number of signal processing circuits C or the number of current sources Q included in one unit circuit Ui is not limited to that in the above examples. For example, as shown in FIG. 9, the structure of one unit circuit Ui having three signal processing circuits C (C1 to C3) and three current sources Q (Q1 to Q3) may be adopted. The current source Q3 is a p-channel thin-film transistor generating a correction current I3 according to the voltage between the gate and the source of the current source Q3 and supplying the correction current I3 to the node z.

Figure 10:
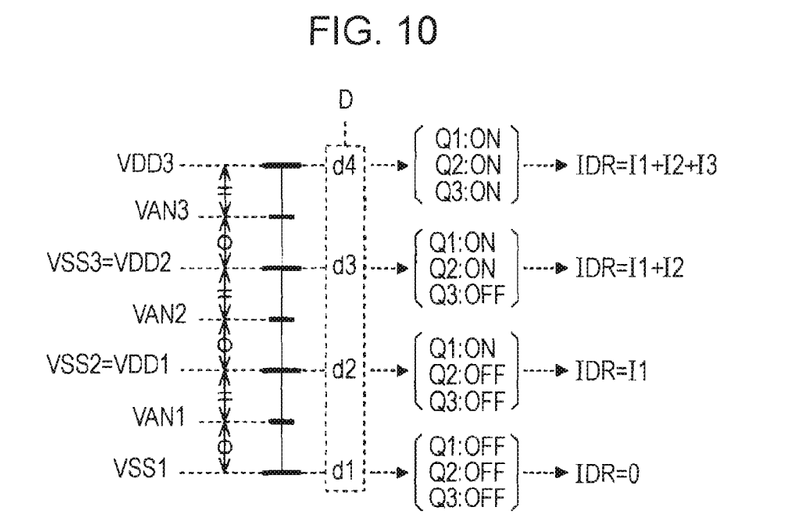
FIG. 10 is a conceptual diagram of the level of each potential generated by the potential generating circuit.

FIG. 10 is a conceptual diagram showing the level of each potential generated by the potential generating circuit 16. As shown in FIG. 10, the potential generating circuit 16 according to a third embodiment additionally generates, besides the potentials shown in FIG. 4, three types of potentials (VDD3, VSS3, and VAN3). The potential VDD3 is the same potential as the potential VDD2. The potential VAN3 is higher than the potential VSS3 and is supplied to the source of the current source Q3. The potential VDD3 is higher than the potential VAN3. As shown in FIG. 10, the data signal D has one of four potentials including the potentials d1 to d3, as in the first embodiment, and a potential d4 equivalent to the potential VDD3.

As shown in FIG. 9, a memory M3 of the signal processing circuit c3 is activated by the potential VDD3 and the potential VSS3 serving as power supply potentials. That is, the memory M3 outputs a control signal G3 at a high level (potential VDD3) in the case that the data signal D obtained from the signal line 18 has one of the potentials d1 to d3. Since the generation of the correction current I3 by the current source Q3 is stopped at this point, as shown in FIG. 10, the relationship between the data signal D and the current value of the drive current IDR is the same as that of the first embodiment. In contrast, in the case that the data signal D has the potential d4, the memory M3 outputs the control signal G3 at a low level (potential VSS3), thereby allowing the current source Q3 to generate the correction current I3. Accordingly, the drive current IDR, which is the sum of the drive current I1, the correction current I2, and the correction current I3, is supplied to the electro-optical element E. The potential VAN3 is set such that a voltage Vgs3 between the gate and the source of the current source Q3 (Vgs3=VSS3−VAN3) becomes equal to the voltage Vgs1 of the current source Q1 and the voltage Vgs2 of the current source Q2.

Figure 11:
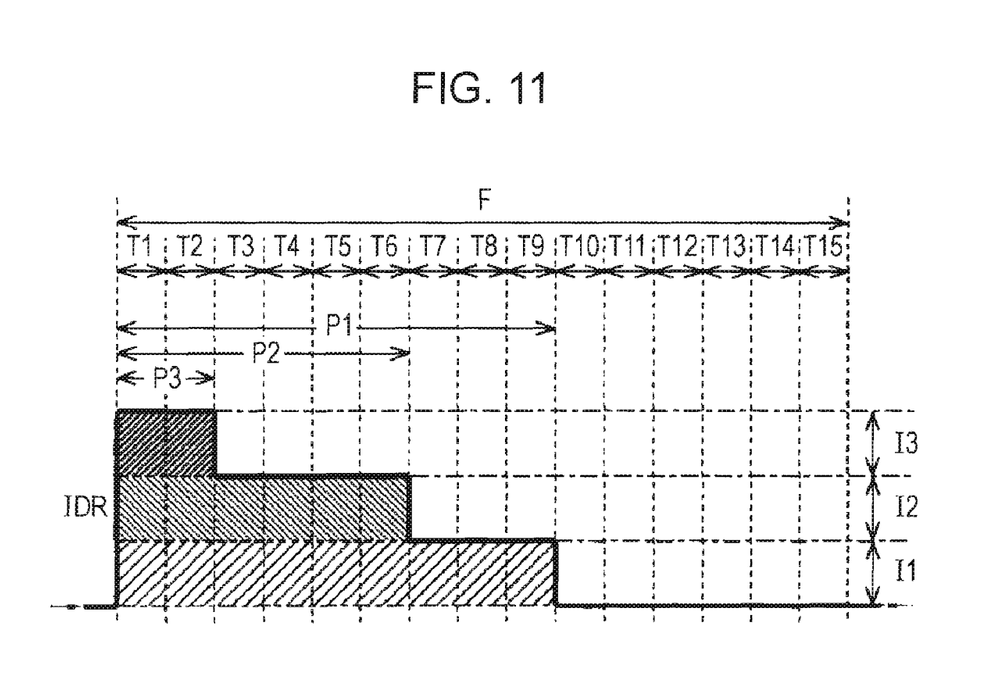
FIG. 11 is a timing chart for describing the waveform of the drive current.

FIG. 11 is a timing chart showing the waveform of the drive current IDR. As shown in FIG. 11, a correction period P3 during which the current source Q3 generates the correction current I3 is a period starting from the beginning of the period F and is set to a period (T1 and T2 of FIG. 11) shorter than the drive period P1 or the correction period P2. Therefore, according to the third embodiment, the current value of the drive current IDR can be corrected with high precision, without inducing a significant increase in the size of the unit circuit Ui, thereby equalizing the tone levels of the electro-optical elements E. Although the structure with changes to the structure of the first embodiment is shown in FIG. 9, the structure of the third embodiment may be applied to the second embodiment.

D. Modifications

Various modifications can be made to the above embodiments. Specific modifications will be described below by way of example. The following modifications may be combined where appropriate.

(1) First Modification

In the above embodiments, the beginning of the drive period P1, the beginning of the correction period P2, and the beginning of the correction period P3 match one another. However, the timing of each period may be changed appropriately. For example, as shown in FIG. 12, the correction period P2 (the correction period P3 in the third embodiment) may begin at a time delayed from the beginning of the drive period P1. Also, plural correction periods (P2 and P3) may be dispersed within the drive period P1. Because capacitors and resistors are added to a line from the unit circuit Ui to the electro-optical element E, the drive current IDR rises gradually at the beginning of the drive period P1 and the correction periods (P2 and P3). If both the drive period P1 and the correction periods (P2 and P3) start at the beginning of the period F, as shown in FIGS. 6 and 11, the rising of the waveform of the drive current IDR can be speeded up, compared with the case shown in FIG. 12.

(2) Second Modification

In the above embodiments, the single-line data signal D is distributed among the unit circuits U1 to Un on a time division basis. Alternatively, different data signals D may be supplied on a parallel basis to the corresponding unit circuits U1 to Un. The structure of the unit circuit Ui may be changed appropriately. For example, the current sources Q may include n-channel transistors, or a plurality of transistors connected parallel to one another may be used as one current source Q. In the case that n-channel transistors are used as the current sources Q, for example, each current source Q is preferably positioned at the cathode side of the electro-optical element E. That is, the anode of the electro-optical element E is set to a constant potential, one current source Q is positioned between the cathode of the electro-optical element E and the potential VAN1, and another current source Q is positioned between the cathode and the potential VAN2.

(3) Third Modification

Organic light-emitting diodes are only examples of the electro-optical elements E. Regarding the electro-optical elements to which various embodiments of the invention are applied, no distinction need to be made between a self-luminescent type that emits light and a non-luminescent type that changes the external light transparency (e.g., liquid crystal elements), or between a current-drive type that is driven by current supply and a voltage-drive type that is driven by voltage application. For example, various electro-optical elements, such as organic EL elements, field-emission (FE) elements, surface-conduction electron-emitters, ballistic electron surface emitters, light-emitting diodes (LEDs), liquid crystal elements, electrophoretic elements, and electrochromic elements can be used in embodiments of the invention.

E. Applications

Figure 13:
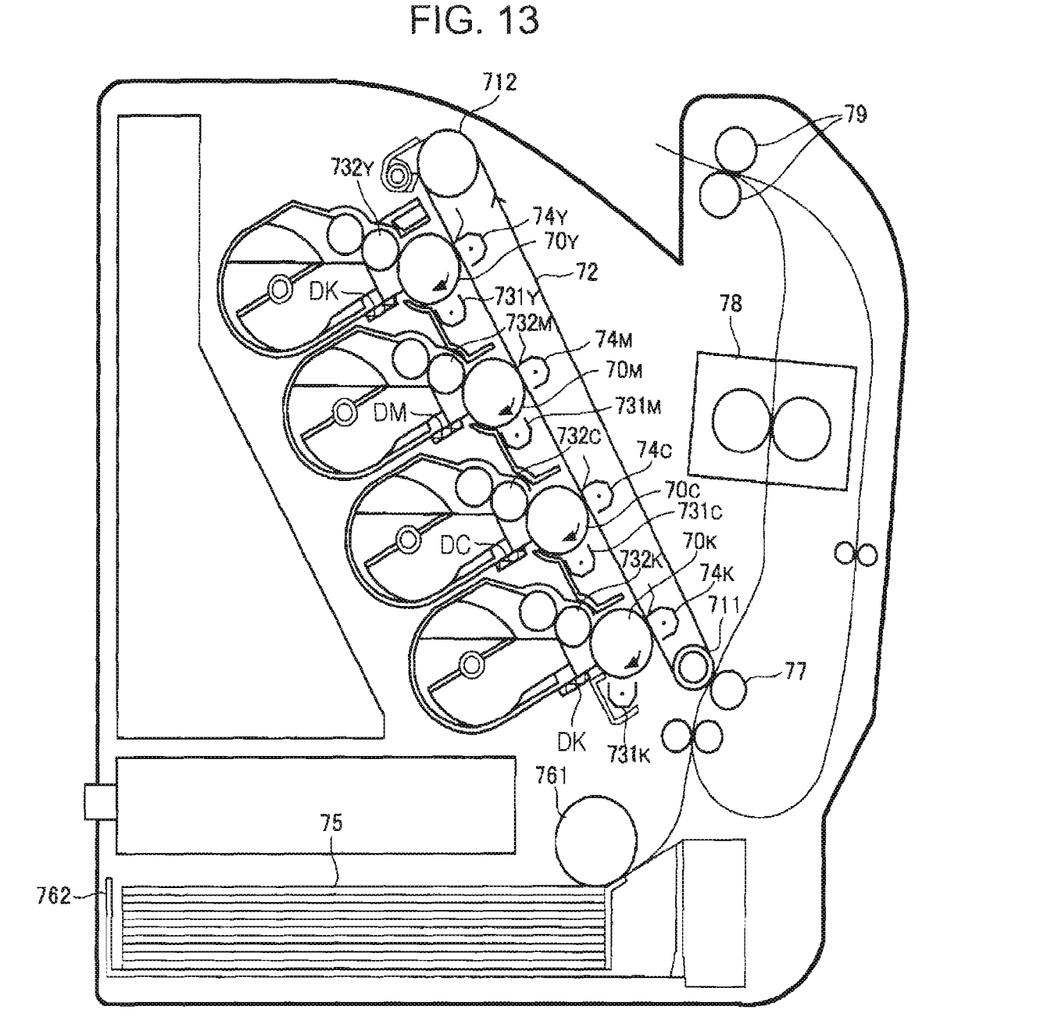
FIG. 13 is a sectional view of the structure of the image forming apparatus.

Next, the structure of an image forming apparatus using the electro-optical device H according to the above embodiments will be described. FIG. 13 is a sectional view of the structure of an image forming apparatus using the electro-optical devices H according to the above embodiments. The image forming apparatus is a tandem full-color image forming apparatus and includes four electro-optical devices H (HK, HC, HM, and HY) according to the above embodiments, and four photosensitive drums 70 (70K, 70C, 70M, and 70Y) corresponding to the electro-optical devices H, respectively. Each of the electro-optical devices H is positioned facing an image forming surface (peripheral surface) of a corresponding one of the photosensitive drums 70. The subscripts "K", "C", "M", and "Y" of the reference numerals mean that the elements are used to develop black (K), cyan (C), magenta (M), and yellow (Y) images.

As shown in FIG. 13, an endless intermediate transfer belt 72 is wound around a drive roller 711 and a driven roller 712. The four photosensitive drums 70 are arranged near the intermediate transfer belt 72 at predetermined intervals. The photosensitive drums 70 rotate in synchronization with the driving of the intermediate transfer belt 72.

Besides the electro-optical devices H, corona charging units 731 (731K, 731C, 731M, and 731Y) and developing units 732 (732K, 732C, 732M, and 732Y) are arranged near the corresponding photosensitive drums 70. Each of the corona charging units 731 uniformly charges the image forming surface of a corresponding one of the photosensitive drums 70. An electrostatic latent image is formed by exposing the charged image forming surface to light using each electro-optical device H. Each of the developing units 732 then develops an image (visible image) on the corresponding one of the photosensitive drums 70 by allowing a developer (toner) to be adhered to the electrostatic latent image.

The black, cyan, magenta, and yellow images developed on the photosensitive drums 70 are sequentially transferred onto the surface of the intermediate transfer belt 72 (first transfer), thereby developing a full-color image. Four first transfer corotrons (transfer units) 74 (74K, 74C, 74M, and 74Y) are arranged inside the intermediate transfer belt 72. Each of the first transfer corotrons 74 electrostatically absorbs the developed image from a corresponding one of the photosensitive drums 70 and transfers the developed image to the intermediate transfer belt 72 passing between the photosensitive drum 70 and the first transfer corotron 74.

Sheets (recording media) 75 are fed one at a time by a pickup roller 761 from a sheet feeding cassette 762 and transported to the nip between the intermediate transfer belt 72 and a second transfer roller 77. The full-color image developed on the surface of the intermediate transfer belt 72 is transferred to one side of the sheet 75 (second transfer) by the second transfer roller 77, and then fused onto the sheet 75 by allowing the sheet 75 to pass through a fusing roller pair 78. A paper-expelling roller pair 79 expels the sheet 75 on which the developed image has been fused in the above steps.

Because the image forming apparatus described above uses the organic light-emitting diodes as light sources (exposure devices), the size of the image forming apparatus becomes smaller than the size of an image forming apparatus using a laser scanning optical system. The electro-optical device H is additionally applicable to image forming apparatuses with structures other than the above exemplary structure. For example, the electro-optical device H is applicable to a rotary developing image forming apparatus, an image forming apparatus that directly transfers an image developed on each photosensitive drum to a sheet without using an intermediate transfer belt, and an image forming apparatus that forms a monochrome image.

The use of the electro-optical device H is not limited to exposing an image supporting member. For example, the electro-optical device H is applied in an image scanning apparatus as an illuminating device for illuminating an object to be scanned, such as a document. This type of image scanning apparatus includes a scanner, a scanning section of a copier and a facsimile machine, a barcode reader, and a two-dimensional image code reader that reads a two-dimensional image code, such as a QR Code®.

The electro-optical device according to the embodiments of the invention can be used as display sections of various electronic apparatuses, such as portable personal computers, cellular phones, personal digital assistants (PDAs), digital still cameras, televisions, video cameras, car navigation systems, pagers, digital notebooks, electronic paper, calculators, word-processors, workstations, videophones, point-of-sale (POS) terminals, printers, scanners, copiers, video players, and apparatuses equipped with a touch panel.

What is claimed is:

1. An electro-optical device comprising:
   a potential generating circuit that generates a first power supply potential and a second power supply potential that is different from the first power supply potential;
   a first signal processing circuit that selectively outputs one of a first high potential and a first low potential according to a data signal at one of at least three levels;
   a second signal processing circuit that selectively outputs one of a second high potential that is different from the first high potential and a second low potential that is different from the first low potential according to the data signal;

a first current source that generates a first current in accordance with an output of the first signal processing circuit and the first power supply potential;

a second current source that generates a second current in accordance with an output of the second signal processing circuit and the second power supply potential;

a control unit that is configured to control the first current source and the second current source such that the second current source generates the second current for a period with a duration that is different than a duration of a period during which the first current is generated; and an electro-optical element that provides a tone level according to the first current and the second current.

2. The electro-optical device according to claim 1, the first signal processing circuit including a first logic circuit that selectively outputs one of the first high potential and the first low potential according to the data signal, the first high potential and the first low potential serving as logic levels, and the second signal processing circuit including a second logic circuit that selectively outputs one of the second high potential and the second low potential according to the data signal, the second high potential and the second low potential serving as logic levels.

3. The electro-optical device according to claim 2, the first low potential and the second low potential being the same potential, and the data signal being at one of the levels of the first high potential, the first low potential, and the second low potential.

4. The electro-optical device according to claim 2, further comprising:

a first selection circuit that selects a first on-potential or a first off-potential according to an output of the first logic circuit; and a second selection circuit that selects (1) a second on-potential that is different from the first on-potential or (2) a second off-potential that is different from the first off-potential, according to an output of the second logic circuit, the first current source generating the first current on the basis of the potential selected by the first selection circuit and the first power supply potential, and the second current source generating the second current on the basis of the potential selected by the second selection circuit and the second power supply potential.

5. The electro-optical device according to claim 1, the first current source being a transistor having a source to which the first power supply potential is supplied and a gate having a potential according to the output of the first signal processing circuit, and the second current source being a transistor having a source to which the second power supply potential is supplied and a gate having a potential according to the output of the second signal processing circuit.

6. An electronic apparatus comprising a housing, and an electro-optical device as set forth in claim 1 inside the housing.

7. An electro-optical device comprising:

a potential generating circuit that generates a first generated potential and a second generated potential;

a first current source that generates a first current based on the first generated potential;

a second current source that generates a second current based on the second generated potential;

a first circuit control unit configured to control the first current source and the second current source such that the second current source generates the second current for a period with a duration that is different than a duration of a period during which the first current is generated;

a second control circuit that generates a data signal of a first potential, a second potential, or a third potential according to a specified tone level; and an electro-optical element that receives a voltage based on the data signal, the first potential causing stopping the first current and the second current to stop; the second potential causing generation of the first current and causing the second current to stop; and the third potential causing generation of the first current and generation of the second current.

8. The electro-optical device according to claim 1, wherein the control unit generates the data signal of at least three levels.

* * * * *